Oct. 6, 1959     O. HAHN     2,907,078
GLASS UNIT FOR STRUCTURE GLAZING
Filed July 17, 1956     2 Sheets-Sheet 1
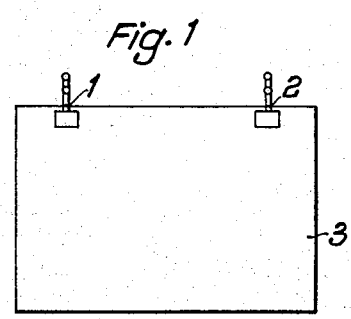
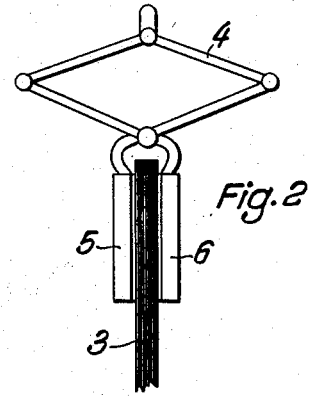
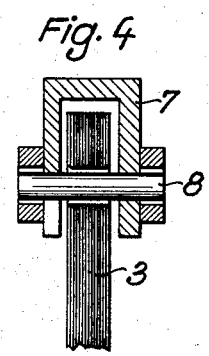
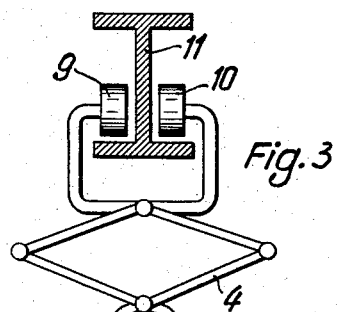
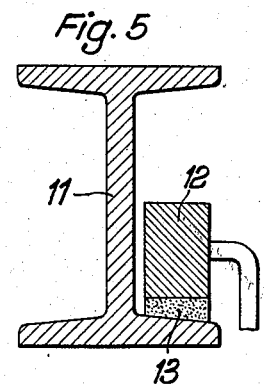
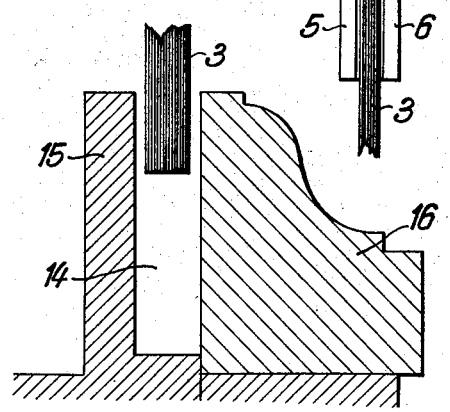
Inventor:
OTTO HAHN
By Hane and Nydick
ATTORNEYS Oct. 6, 1959 O. HAHN 2,907,078
GLASS UNIT FOR STRUCTURE GLAZING
Filed July 17, 1956 2 Sheets-Sheet 2
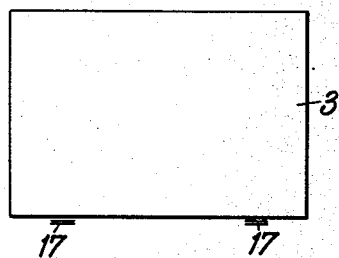
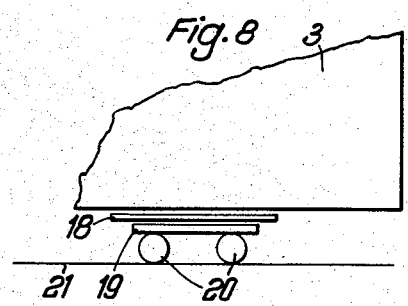
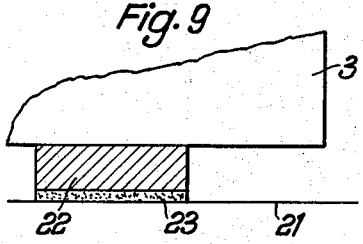
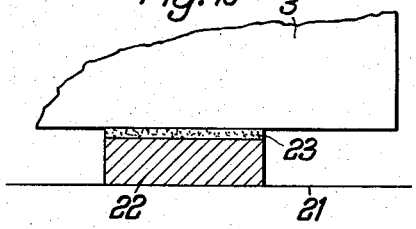
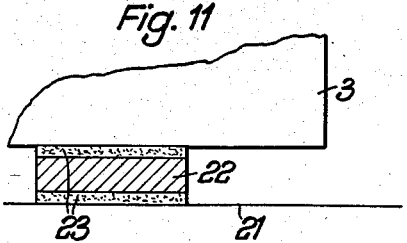
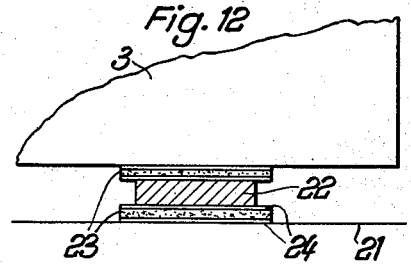
Inventor:
OTTO HAHN
By Hane and Nydick
ATTORNEYS

United States Patent Office 2,907,078
Patented Oct. 6, 1959

2,907,078

GLASS UNIT FOR STRUCTURE GLAZING

Otto Hahn, Frankfurt am Main, Germany, assignor to Glasbau Heinrich Hahn, Frankfurt am Main, Germany, a firm Application July 17, 1956, Serial No. 598,390

Claims priority, application Germany July 21, 1955

5 Claims. (Cl. 20—52)

This invention relates to glass unit and particularly to the glazing of buildings, structures including skeleton structures, and the like, with glass panes or plates of relatively large dimensions.

Prior to this invention it has been the custom to fit such glass plates immovably into frames in which they were held in a state of unstable equilibrium with the object of preventing their falling out. But this way of fitting the plates did not comply with the characteristics of certain structures, particularly steel skeleton or armed concrete buildings which are known to have a tendency of undergoing certain structural alterations which the immovably fitted glass plates are unable to follow.

The invention has the object of removing this deficiency particularly in connection with the glazing of structures with plates of large surface area, in which the said plates are freely movable in relation to their adjacent structural members, by fitting the glass plates so as to be free along their vertical edges and one horizontal edge, while the other horizontal edge is caused to rest on its seat, or to be suspended from above as the case may be. The chief advantage obtained in this way is an undisturbed movability of the glass plates in that they are either freely suspended or, in the case of standing plates, capable of small sliding or rolling movement upon their supports.

The means for the suspension of the glass plates may be of various kind. One form for instance would be a kind of lazy-tongues arrangement in which the plate is held by clamps which are pressed against it by its own weight. Another possibility is by securing appropriate fittings to the upper edge of the plate which may be screwed, cemented, or otherwise fixed thereto, or by the provision of a channeled bridge or stay with bolts passing through the walls thereof and through holes drilled into the glass plate for the purpose.

Such suspension means may be made to slide or roll on the carrying part of the structure similar to the sliding or rolling means already referred to in connection with standing glass plates. It will be understood that, since a glass plate which is suspended in the aforementioned or a similar manner, can freely adjust itself in a vertical position, it will be wholly undisturbed by any distortions or alterations which may take place in its surrounding structure.

Another advantage of a suspension in accordance with the invention rests in the elimination of any tensile stresses in the glass plate, which enables the employment of very light frames and, if any, separating stays or, in the case of full structure glazing, of only narrow stabilizing bodies since, after all, these parts are mere redundant members serving only for the taking up of small additional loads, such as wind pressure for instance, but do not take part in holding the glass plate.

A further advantage obtained by the invention is the possibility of using thinner glass plates than heretofore.

In structure glazing as practiced prior to this invention a break in the plate would almost invariably cause the destruction of the entire pane, and it is, therefore, a still further advantage of the suspended arrangement of the plates in accordance with the invention, that for instance the lower part of the plate may break without the risk of the other part or parts falling out and causing damage.

Yet another advantage is to be seen in the fact that the notch or channel in the structure, within which the glass plate is confined with its lower edge, may be made sufficiently deep for the plate to be freely suspended therein without actually touching the ground of the notch or channel which, in the present way of fitting, is very often the cause of breakages.

The invention also provides that the sliding or rolling arrangement of the suspension means or, in a standing plate, of the lower plate edge renders the plate surface independent of stresses which may be caused by varying coefficients of expansion in the glass or in the adjacent metallic or other structure.

Other features and advantages of the invention will be apparent from the now following description of the accompanying drawings, in which several modifications of the invention are diagrammatically illustrated by way of example. In these drawings:

Fig. 1 shows the general arrangement of a glass plate and its suspension means.

Fig. 2 illustrates a suspension device of the lazy-tongues type.

Fig. 3 is a suspension means similar to Fig. 2 provided with rollers.

Fig. 4 resembles a section through a suspension consisting of a channeled stay and fixing bolts.

Fig. 5 is a cross section through an embodiment in which a sliding block is used to afford lateral movability of the glass plate.

Fig. 6 illustrates the arrangement of a deep channel for the reception of the lower edge of the glass plate.

Fig. 7 shows the general arrangement, similar to Fig. 1, of a standing glass plate on a slidable support.

Fig. 8 illustrates an embodiment of the invention using a rolling support for the plate.

Figs. 9 to 12 are modifications of the movable support using sliding blocks with different types of intermediate layers of gliding material.

In the illustration of Fig. 1 the glass plate or pane 3 is suspended in hangers 1 and 2 which may be fitted thereto in any known or convenient manner, for example as shown in Fig. 2 in which a link 4 of the lazy-tongues type is provided with jaws 5 and 6. These jaws, each of which forms part with one of the lower tongue members, is pressed against the plate by the own weight of the same. The lazy-tongues link 4 may be suspended in the structure to be glazed by a hook or the like and it will be seen that the heavier the glass plate is, the faster it will be pressed by the said clamping members. In order to provide for lateral movement, the link 4 may be fitted with a pair of rollers 9, 10 adapted to permit of a certain amount of movement along a girder or other carrying member, which in the drawing is denoted by the Figure 11.

Fig. 4 shows a particularly simple type of suspension. The glass plate 3 is drilled for the reception of a bolt, or bolts, 8 which rests with its ends in an inverted U-shaped member 7.

The rollers 9, 10 of the embodiment shown in Fig. 3 may be replaced, as shown in Fig. 5, by a sliding block 12, provided preferably with a layer of gliding or anti-friction material 13, such as mica, French chalk, a lubricant, or the like.

Fig. 6 shows a deep channel 14 between the sustaining structure parts 15 and 16, into which the lower edge of the plate 3 may enter and which allows of a certain adaptability of the glass plate to vertical distortions of the structure members without the risk of the said lower edge ever hitting the ground of the channel.

The diagrammatically indicated sliding support 17 for the glass plate 3 of Fig. 7 may, in practice, consist of an arrangement such as shown in Fig. 8, in which the plate 3 rests with a layer 18 of pliable material, such as leather, on a plate 19 and rollers 20 which are free to move on a supporting member 21 of the structure to be glazed.

The sliding supports shown in Figs. 9 to 12 consist each of a block 22 with a layer 23 of gliding or anti-friction material, which may be provided at the bottom, the top, or at both the top and bottom of the said block. If desired the said layers 23 may be packed between plates 24 of metal or other material.

It is to be understood that the invention is not intended to be limited to the embodiments herein shown and described, but that it may be modified in various other ways to suit practice, or convenience, the essential feature, however, being the suspension or support of a glass plate in a buiding or other structure so that its movability will not be impaired or interfered with by surrounding or adjacent parts of the structure.

What I claim is:

1. A glass unit for building and structure glazing having glass plates arranged for restricted but free movement in relation to their inclosing parts of the structure, comprising, glass plates of relatively large dimensions having two substantially vertical and two substantially horizontal edges, links for suspending each glass plate at its upper horizontal edge, freely movable clamps in connection with said links closable at approximately right angles upon said glassplate, and suspension means for pressing said clamps against the glass plate by the weight of the latter acting on the said links being suspended in the structure to be glazed.

2. A glass unit as claimed in claim 1, in which the said links are in the shape of a lazy-tongues arrangement having the said clamping jaws one each at the lower links of said lazy-tongues arrangement, and a suspension member on the upper links for suspending said lazy-tongues arrangement in the structure to be glazed.

3. A glass unit for building and structure glazing having glass plates arranged for restricted but free movement in relation to their inclosing parts of the structure, comprising, glass plates of relatively large dimensions having two vertical and two horizontal edges, a member stretching longitudinally across the width of the glass plate above the upper edge thereof, clamping means communicating with the upper edge of the plate for suspending it on the said member, suspension links in connection with said clamping means for moving them against each other and into contact with the glass plate between them, and means interposed between the said links and the said longitudinal member for affording movement of the glass plate in the longitudinal direction of the said member.

4. A glass unit for building and structure glazing, comprising, unframed glass plates of relatively large dimensions having two vertical and two horizontal edges, a clamp in connection with the upper horizontal edge of each glass plate for sustaining it in place on the structure while the other horizontal edge and both vertical edges are left free for independent movement in relation to their adjacent parts of the structure, a frame for loosely receiving said glass plate, and grooves in the said frame within which the said glass plate is able to move with a certain amount of play in relation to the said frame, the groove at the lower end of the frame being deeper than the other grooves for enabling the said glass plate, in its vertical movement, dipping deep into the said groove without the risk of touching the bottom thereof.

5. Glass unit for building and structure glazing having glass panes arranged for restricted but free movement in relation to their inclosing parts of the structure, each unit comprising, a glass pane of relatively large dimensions having two substantially horizontal and two substantially vertical edges, clamps near the upper horizontal edge of the said glass pane for freely suspending the said pane on the inclosing structure while the other horizontal edge and both vertical edges are left free for independent movement in relation to their adjacent parts of the said structure, and interconnecting links in connection with the said clamps for causing the said links to exert the clamp actuating pressure by the action of the weight of the suspended plate.

References Cited in the file of this patent

UNITED STATES PATENTS

| | | |
|---|---|---|
| 987,776 | Verdin | Mar. 29, 1911 |
| 2,126,111 | Holderle et al. | Aug. 9, 1938 |
| 2,617,159 | Leighton | Nov. 11, 1952 |
| 2,684,506 | Tadd | July 27, 1954 |
| 2,723,427 | Bobel | Nov. 15, 1955 |